United States Patent
Halley et al.

(10) Patent No.: US 12,548,341 B1
(45) Date of Patent: Feb. 10, 2026

(54) DIGITAL VIDEO AUDIT SYSTEM FOR TOLLING

(71) Applicant: TOLLSCOPIC, LLC, Miami, FL (US)

(72) Inventors: Daniel Ignacio Halley, Miami, FL (US); Ignacio Halley, Miami, FL (US); Michael Anthony Halley, Miami, FL (US); Alejandro Andres Halley, Miami, FL (US); Alexander Medina Monteagudo, Dublin, FL (US); Robert F. Hugues, Miami, FL (US); Raciel Leiva, Miami, FL (US)

( * ) Notice: Subject to any disclaimer, the term of this patent is extended or adjusted under 35 U.S.C. 154(b) by 0 days.

(21) Appl. No.: 19/225,269

(22) Filed: Jun. 2, 2025

(51) Int. Cl.
| | |
|---|---|
| G06V 20/54 | (2022.01) |
| G06T 7/246 | (2017.01) |
| G06T 7/292 | (2017.01) |
| G07B 15/02 | (2011.01) |
| H04N 7/18 | (2006.01) |

(52) U.S. Cl.
CPC .............. *G06V 20/54* (2022.01); *G06T 7/246* (2017.01); *G06T 7/292* (2017.01); *G07B 15/02* (2013.01); *H04N 7/181* (2013.01); *G06Q 2240/00* (2013.01); *G06T 2207/10016* (2013.01); *G06T 2207/20081* (2013.01); *G06T 2207/30232* (2013.01); *G06T 2207/30236* (2013.01); *G06T 2207/30241* (2013.01); *G06V 2201/10* (2022.01)

(58) Field of Classification Search
None
See application file for complete search history.

(56) References Cited

U.S. PATENT DOCUMENTS

| | | | |
|---|---|---|---|
| 7,232,064 B1 * | 6/2007 | Toohey | G06F 16/51 |
| | | | 235/384 |
| 2025/0053753 A1 * | 2/2025 | Zhou | G06F 40/40 |

FOREIGN PATENT DOCUMENTS

| | | | | |
|---|---|---|---|---|
| CN | 103985257 A | * | 8/2014 | |
| CN | 109949351 A | * | 6/2019 | |
| CN | 116153092 B | * | 3/2024 | G08G 1/0175 |

* cited by examiner

*Primary Examiner* — James M Anderson, II
(74) *Attorney, Agent, or Firm* — Sanchelima & Associates, P.A.; Jesus Sanchelima; Christian Sanchelima

(57) ABSTRACT

A Digital Video Audit System for toll transaction verification, speed enforcement, and vehicle monitoring that synchronizes multiple video feeds with comprehensive vehicle metadata. The system integrates a camera assembly capturing video streams of vehicles traversing infrastructure with a server assembly that processes these streams using machine learning modules. A multi-object tracking module generates vehicle trajectories by applying deep learning object detectors and tracking algorithms, while an event correlation module associates events with these trajectories. The DVAS displays zone controller transactional data overlaid or adjacent to video data through an intuitive user interface, enabling dynamic filtering by various vehicle characteristics and transaction parameters. The system incorporates redundancy features and security measures to prevent revenue loss and ensure data integrity. By providing synchronized visual verification of toll transactions with corresponding metadata, the DVAS facilitates efficient auditing, accurate toll collection, and reporting across tolling facilities, even in challenging traffic conditions where conventional systems may fail.

7 Claims, 15 Drawing Sheets

DIGITAL VIDEO AUDIT SYSTEM FOR TOLLING

BACKGROUND OF THE INVENTION

1. Field of the Invention

The present invention relates to vehicle monitoring and tolling systems and, more particularly, to a Digital Video Audit System (DVAS) that synchronizes multiple video feeds with comprehensive vehicle metadata for efficient toll transaction verification, auditing, and reporting.

2. Description of the Related Art

Numerous systems have been proposed and implemented for video-based vehicle tracking, traffic monitoring, and toll management applications. However, existing approaches suffer from several drawbacks that the present Digital Video Audit System (DVAS) invention aims to address.
Video-Based Vehicle Tracking Systems CN103985257A to Nantong University teaches an intelligent traffic video analysis method focused on tracking vehicles using video sequences. The system employs image processing and mode matching methods for visual tracking of target vehicles and can narrow search ranges in video databases. While this system offers some capabilities for vehicle tracking, it lacks comprehensive data integration, advanced filtering options, and the robust user interface necessary for efficient toll auditing. The system primarily focuses on tracking and locating vehicles rather than providing a holistic solution for toll transaction verification and auditing.

CN109949351A to Zhengzhou Xinda Advanced Technology Research Institute discloses a target vehicle driving track extraction device and method based on video structured monitoring. This system collects video streams of road intersections in real-time and extracts structured text data and key video frames. While providing some retrieval capabilities for specific vehicles, the system is narrowly focused on extracting vehicle trajectories for investigative purposes rather than offering the comprehensive auditing and reporting tools required for effective toll management.

U.S. Pat. No. 7,232,064 to SYNTONIC TECHNOLOGY INC discloses a method and system for building and utilizing a database containing images of transactions. As transactions are performed, a camera takes images of the transactions. These images are correlated to data that outlines the details of the transaction that includes date, time and sometimes the amount of money exchanged. The images and data are stored in a database for easy retrieval using query instructions so that a particular transaction and its corresponding image are quickly retrieved. The U.S. Pat. No. 7,232,064 lacks the advanced features described in the present invention, such as dynamic filtering based on vehicle characteristics, machine learning enhancements, and a scalable, hardware-agnostic infrastructure.
Traffic Monitoring and Anomaly Detection CN116153092B describes a tunnel traffic safety monitoring method and system that employs multiple video collection devices to track vehicles across tunnel entrances, interiors, and exits. The system conducts multi-target tracking and vehicle license plate recognition. However, its application is limited to tunnel environments and lacks the broader transportation infrastructure coverage, synchronized metadata integration, and advanced user-centric features that distinguish the present invention.

CN114333308A discloses a traffic abnormality recognition method that processes traffic video data to identify vehicles and their attributes, allowing for real-time anomaly detection. While this system captures vehicle attributes from video data, it focuses primarily on identifying traffic anomalies rather than providing comprehensive data visualization or auditing capabilities. The patent does not address the integration of transactional data or the advanced filtering and reporting tools essential for toll management.

CN109714565A presents a video tracking application method based on video structuring technology that analyzes multiple video paths in real-time and tracks targets across cameras. Although this patent shares some similarities with the present invention in terms of real-time video analysis, it is designed primarily for security and law enforcement applications rather than toll management and auditing.
Limitations of Existing Systems The prior art collectively fails to provide a unified solution that addresses the specific needs of toll operators for comprehensive transaction verification and auditing. Existing systems typically suffer from several key limitations:

Vehicle Occlusion Challenges: A critical limitation of existing systems is their inability to handle vehicle occlusion scenarios effectively. In high-density traffic situations, vehicles may partially or completely block the view of other vehicles from certain camera angles, resulting in incomplete capture of vehicle identifiers such as license plates. Current systems typically rely on single-point detection, making them highly vulnerable to occlusion events that lead to transaction errors, revenue leakage, and incomplete audit trails. Unlike the present invention, these systems lack the trajectory-based approach necessary to overcome occlusion by correlating multiple detection events across different cameras and positions.

Fragmented Visualization: Legacy systems lack the ability to synchronize multiple video feeds on a single platform, requiring operators to navigate between separate interfaces to view different camera angles.

Limited Data Integration: Current solutions fail to integrate video, transactional data, and vehicle metadata in a unified interface, forcing operators to correlate information across multiple systems.

Restricted Filtering Capabilities: Existing systems offer limited filtering options, making it difficult to efficiently search through large volumes of toll transaction data across multiple dimensions such as time, lane, vehicle characteristics, and transaction parameters.

Inadequate Audit Tools: Legacy systems lack comprehensive audit and reporting capabilities, hindering operators' ability to efficiently verify, correct, and document toll transactions.

Inflexible Architecture: Many existing solutions employ rigid architectures that struggle with scalability and adaptability to changing requirements, limiting their effectiveness across diverse transportation infrastructures.

The present Digital Video Audit System invention addresses these limitations by providing a comprehensive, user-centric solution specifically designed for toll transaction verification and auditing, offering significant advantages over the prior art in terms of data integration, visualization, filtering capabilities, and operational efficiency.

The present invention introduces a novel approach to automatic toll collection and vehicle monitoring that addresses several key limitations of legacy systems. Unlike conventional static camera setups that rely on capturing vehicle information at a single point, the present solution leverages video streams to create comprehensive trajectory maps of vehicle movements. By tracking a vehicle's path across multiple "events" or positions, the system can cross-reference and piece together complete vehicle information (make, model, license plate, and even driver imagery) even when specific details are obstructed or blocked at individual events, such as in bumper-to-bumper traffic scenarios.

The present invention employs a sophisticated approach to vehicle tracking and event correlation that addresses a critical challenge in toll monitoring: ensuring complete vehicle information capture despite potential occlusions or obstructions.

The DVAS correlates events from multiple detection devices deployed across the tolling infrastructure. Each detection event captures valuable vehicle data, including license plates, make and model details, and vehicle imagery. The system's core strength lies in its ability to stitch together these disparate events into a coherent trajectory map for each vehicle.

This trajectory-based approach represents a significant advancement over conventional systems that rely on single-point detection. When a vehicle's license plate or other identifying features are temporarily obstructed at one detection point—a common occurrence in congested traffic scenarios—the DVAS can still construct a complete vehicle profile by correlating data from multiple detection points along the vehicle's journey. This is achieved by employing statistical methods, such as the "nearest neighbor" method, to group events along a vehicle's trajectory line, enabling the system to fill in any gaps or missing data points by cross-referencing information from other events in the trajectory.

By mapping each vehicle's complete trajectory through the tolling infrastructure and associating all relevant detection events with that trajectory, the DVAS provides toll operators with comprehensive vehicle information for audit purposes, even in challenging conditions where traditional systems would fail due to incomplete data capture at individual points. This capability ensures transaction integrity and supports accurate revenue collection by minimizing information gaps in the audit trail.

The hardware infrastructure supporting the DVAS can be flexibly configured to match specific deployment requirements and budget constraints while maintaining the system's core trajectory mapping functionality, which is essential for effective toll transaction auditing In contrast, legacy systems lack the capability to connect events using trajectory mapping, rendering them vulnerable to incomplete data collection and subsequent revenue leakage for toll agencies due to missing vehicle information in some scenarios.

Legacy tolling systems generate transactions for a given vehicle A based solely on the signals captured at a specific gantry X at time t. However, the present invention can incorporate signals from multiple gantries across the entire tolling network.

The invention models the network of gantries (which may span multiple roads) as a Markov chain-a stochastic model describing a sequence of events where the probability of each event depends only on the previous state. For example, if a vehicle A is detected at gantry X at time t, the system can predict that A will likely be at gantry Y at time t1 with probability p1, or at gantry Z at time t2 with probability p2, and so on.

These predictions and probabilities are determined by combining: 1) The network topology, represented as a graph, with gantries as vertices and road segments as edges. 2) Dynamic traffic parameters like median speeds, accidents etc. along each edge.

Incorporating data from multiple gantries across the network, rather than just the local gantry, enables increasing the confidence of vehicle matching and tolling transaction generation. This cross-gantry signal correlation is a key advantage over current solutions that rely only on single-gantry data.

Furthermore, the solution posited by the present invention offers additional functionalities beyond toll collection, such as lane violation detection, accident monitoring, and more, without the need for costly radar installations.

By addressing the critical challenge of obstructed vehicle information in high-traffic conditions, the disclosed trajectory-based approach minimizes revenue leakage for toll agencies, enabling them to collect tolls from a higher proportion of vehicles by piecing together complete vehicle data from multiple events along each vehicle's trajectory. This translates to increased revenue generation and operational efficiency compared to legacy systems that struggle with incomplete data collection in such scenarios.

Other documents describing the closest subject matter provide for a number of more or less complicated features that fail to solve the problem efficiently and economically. None of these patents suggest the novel features of the present invention.

SUMMARY OF THE INVENTION

It is one of the objects of the present invention to provide an advanced Digital Video Audit System designed to enhance the efficiency, accuracy, and management of toll transaction verification.

Another object of this invention is to provide a system that integrates synchronized video feeds with comprehensive vehicle metadata to optimize tolling audit processes while improving revenue assurance, transaction verification, and user experience.

The present invention serves multiple objectives, aiming not only to streamline toll transaction auditing but also to provide a comprehensive platform for toll operators to verify, validate, and correct toll transactions through an intuitive interface. Its innovative design synchronizes multiple video feeds with transaction data and vehicle metadata, offering a unified view that eliminates the need to navigate between disparate systems.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
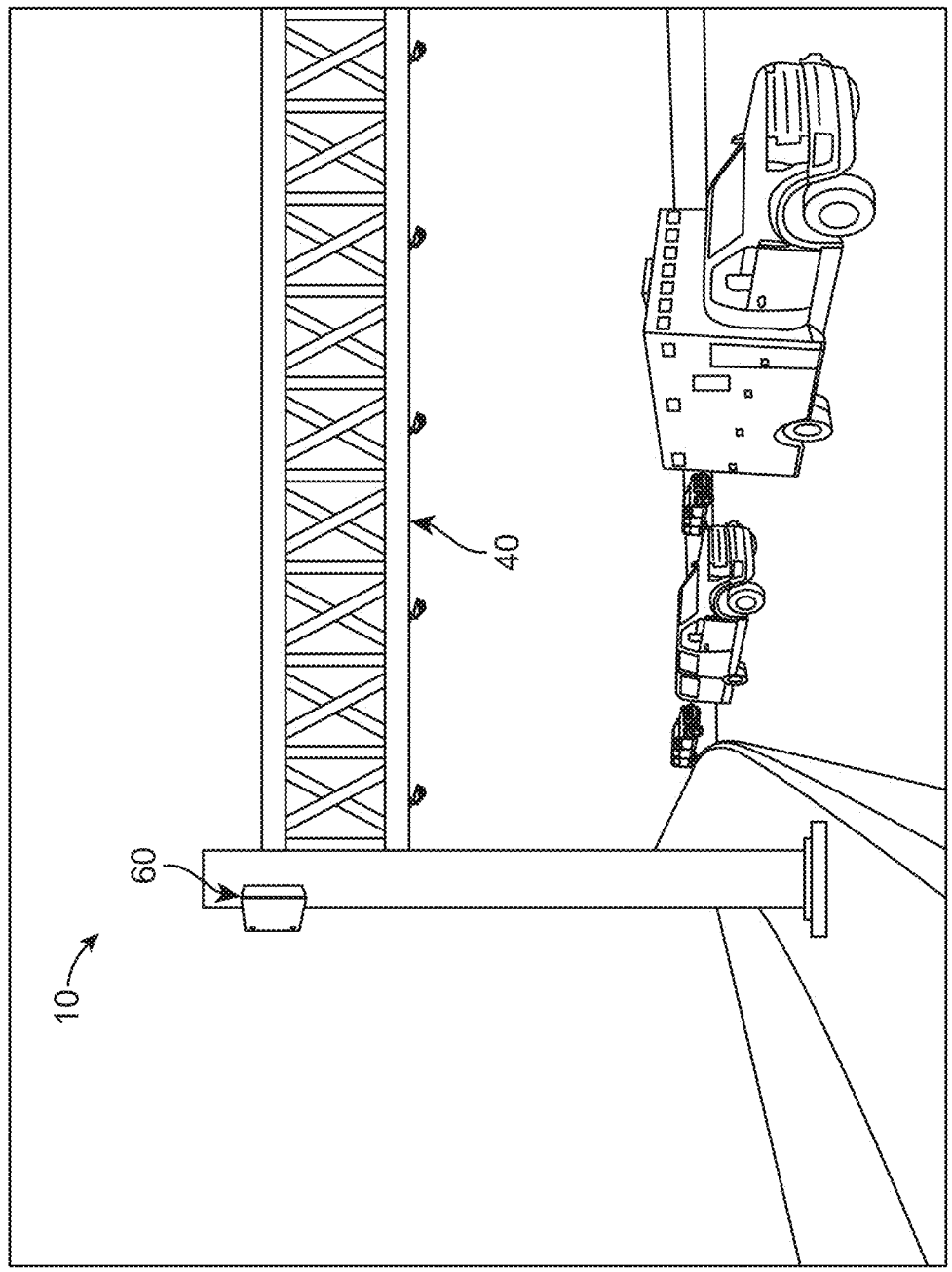
FIG. 1-4 represent operational views of the present invention 10 according to exemplary embodiments.
Figure 2:
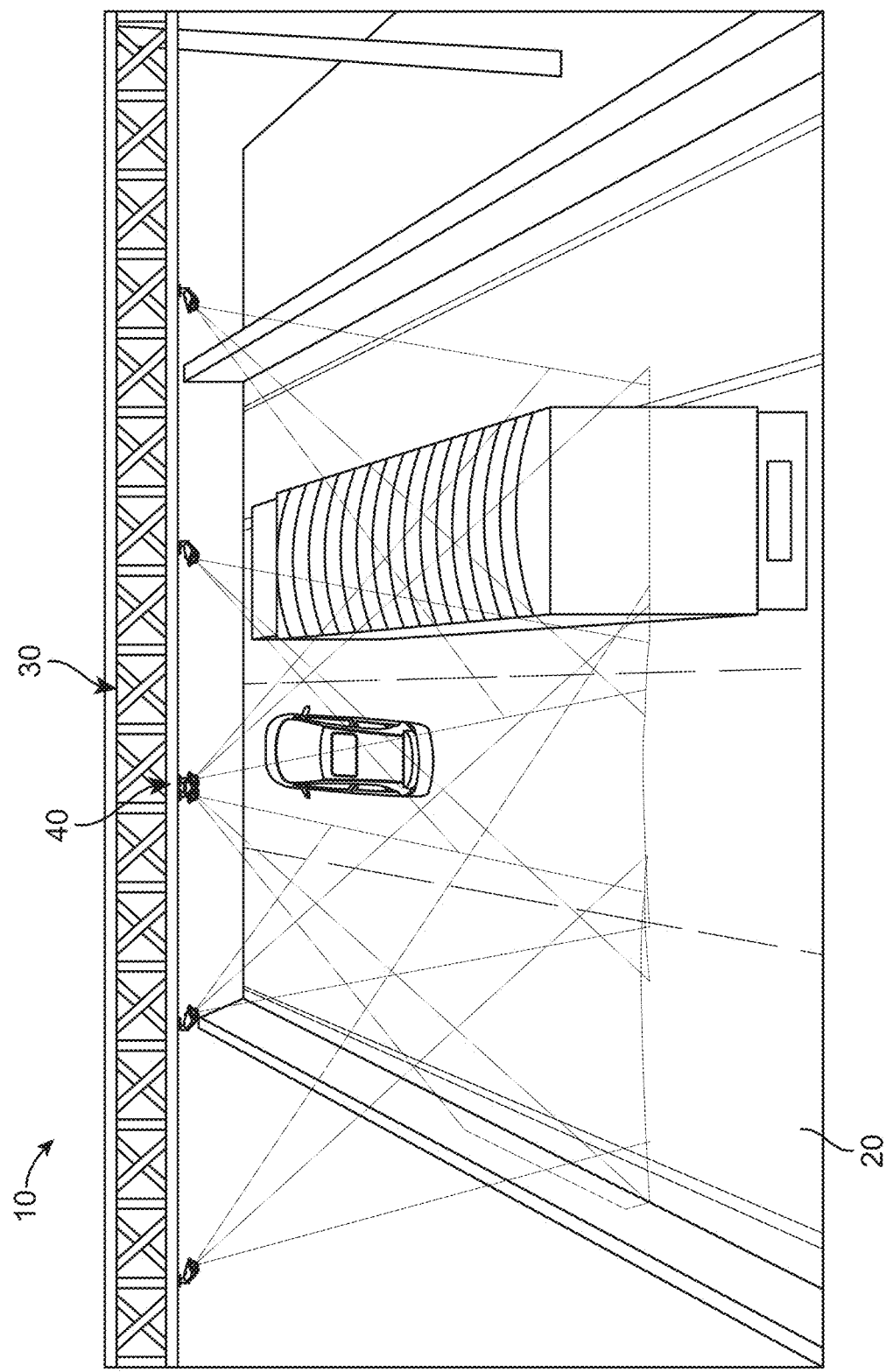
Figure 3:
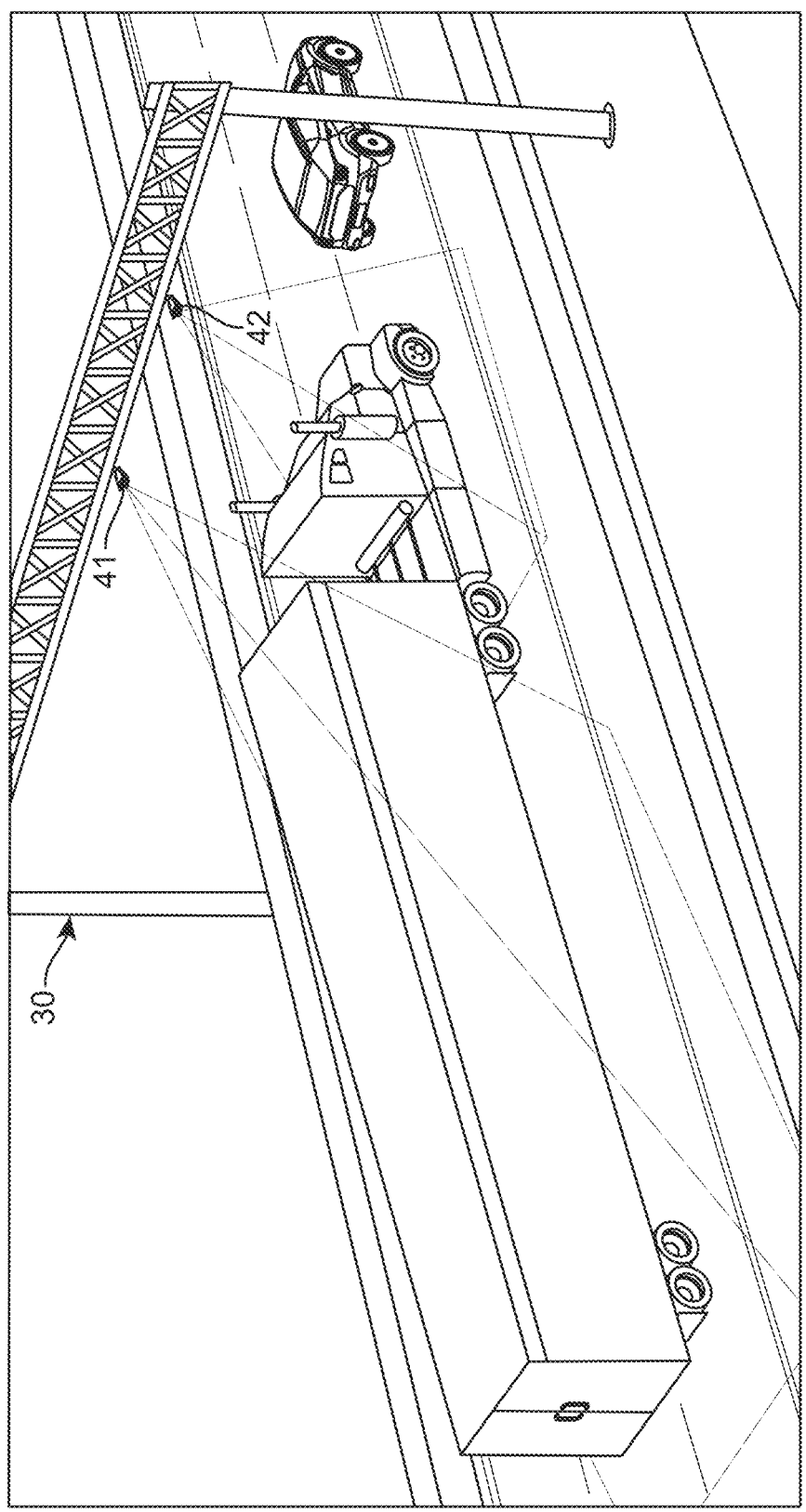
Figure 4:
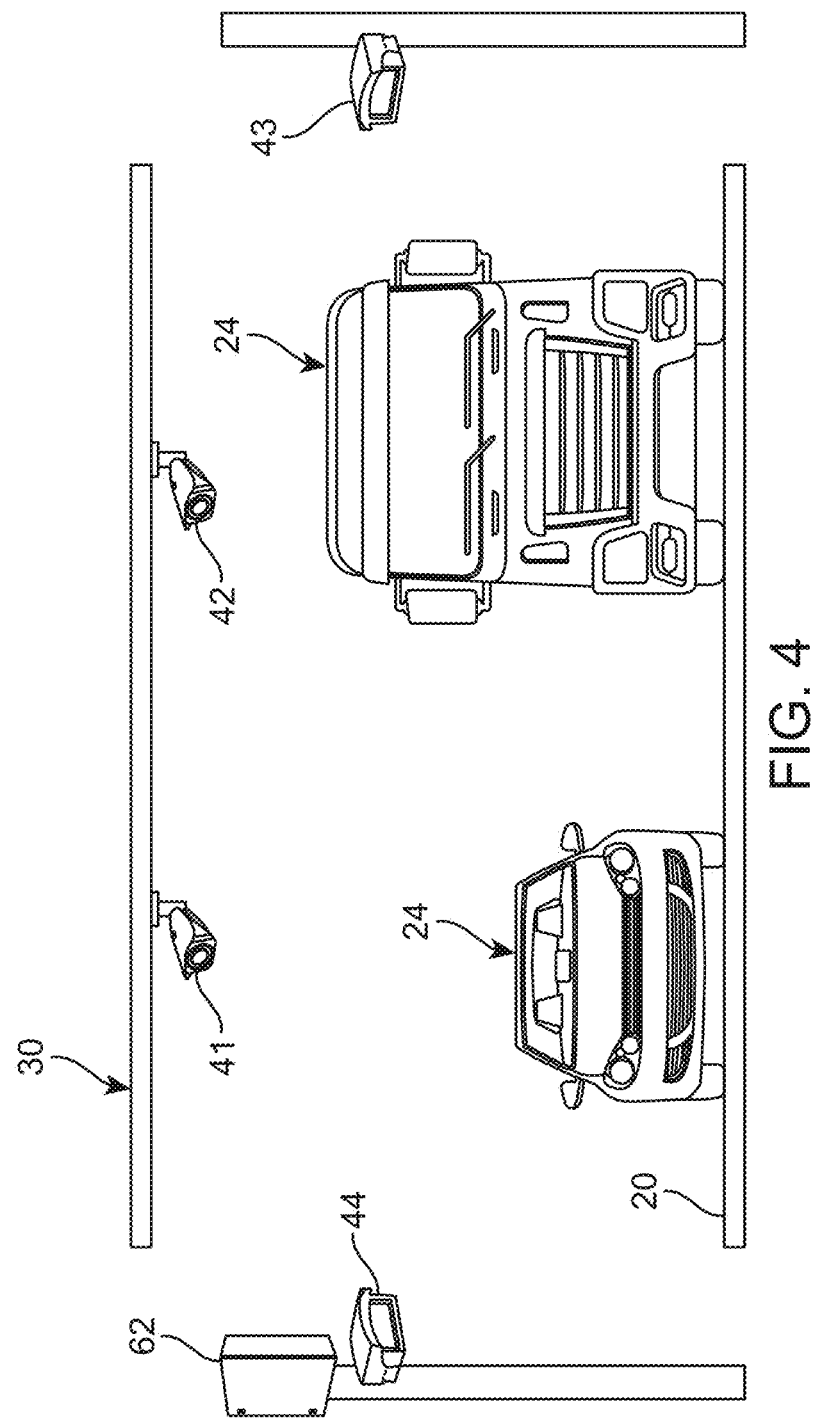
Figure 5:
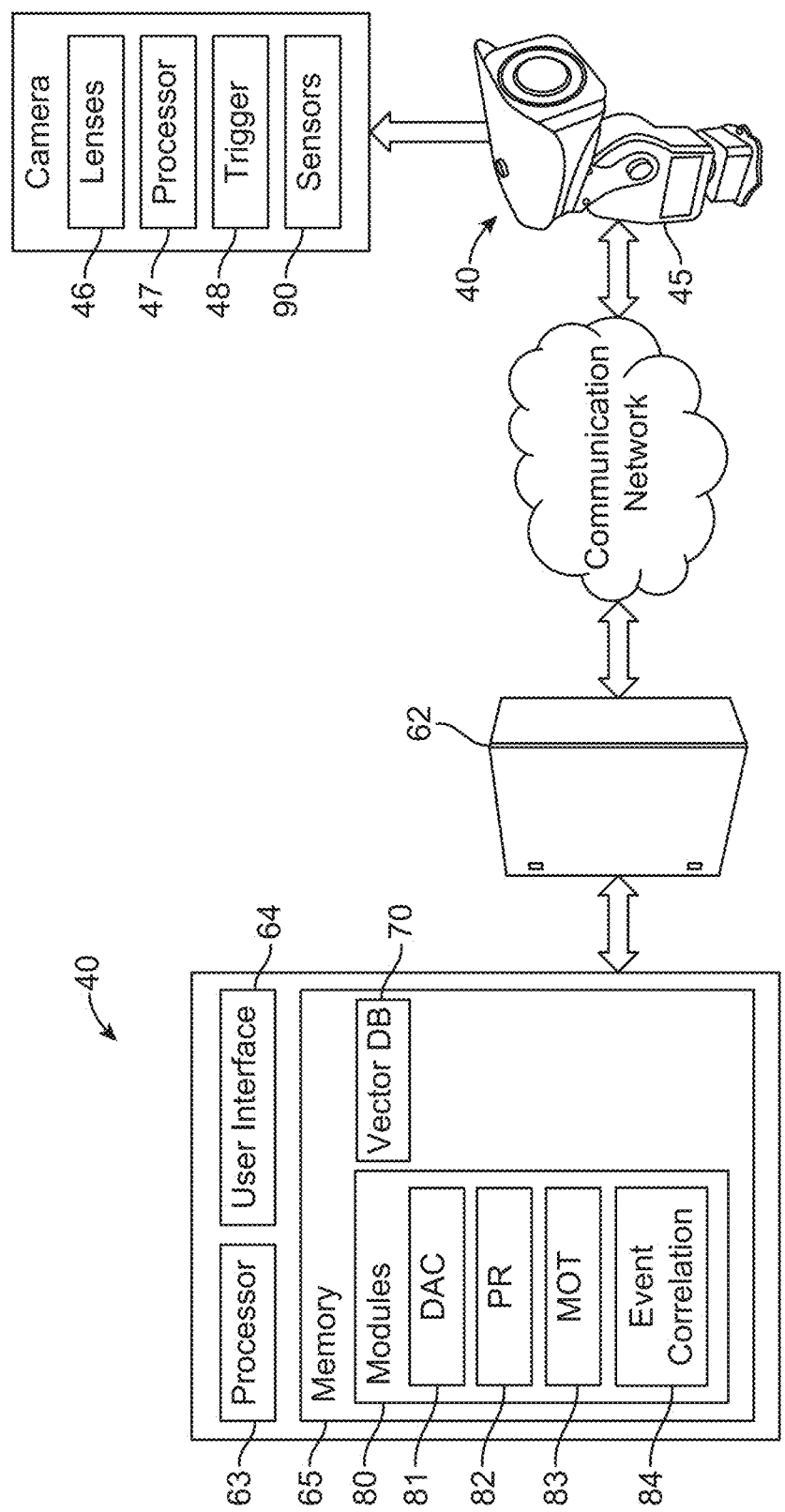
FIG. 5 shows a schematic diagram of the present invention according to an exemplary embodiment.

Some embodiments of this disclosure, illustrating all its features, will now be discussed in detail. The words "comprising", "having", "containing", and "including", and other forms thereof, are intended to be open-ended in that an item or items following any one of these words is not meant to be an exhaustive listing of such item or items, or meant to be limited to only the listed item or items.

It should also be noted that as used herein and in the appended claims, the singular forms "a", "an", and "the" include plural references unless the context clearly dictates otherwise. Although any systems and methods similar or equivalent to those described herein can be used in the practice or testing of various embodiments of the present disclosure, various embodiments of the systems and methods will be described.

Embodiments of the present disclosure will be described more fully hereinafter with reference to the accompanying drawings in which numerals may represent elements throughout the figures, and in which various example embodiments are shown. Various embodiments may, however, be embodied in many different forms and should not be constructed as limited to the embodiments set forth herein. Therefore, specific details disclosed herein are not to be interpreted as limiting, but rather as a basis and/or principle for the claims, and/or as a representative basis for teaching one skilled in the art to employ this invention in virtually appropriately detailed system, structure, or matter.

The present invention 10 includes a camera assembly 40, preferably mounted on a support structure 30. The camera assembly 40 is positioned in relation to a predetermined area which, in a preferred embodiment, is a road surface 20 traversed by objects, wherein in a preferred embodiment, said objects are going to be vehicles; for the sake of example, the number 24 is used to designate a single terrestrial vehicle, which may have any number of axles 25. The camera assembly 40 is mounted on the support structure 30 at an elevated position above the road surface 20. In alternative exemplary configurations, the camera assembly 40 could be attached to various structures along the roadway, including bridges, overpasses, barriers, or standalone posts positioned horizontally from or adjacent to the road surface 20.

In one embodiment, the camera assembly 40 may comprise a front camera 41, a rear camera 42, a right axle camera 43, and a left axle camera 44. It should be noted that depending on operational conditions such as dimensions of the road surface 20, or the like, the camera assembly 40 may include at least one camera or a plurality of cameras. In the preferred setup, cameras 41 and 42 are placed at an elevated position above the road surface 20, allowing each vehicle to pass beneath the area where the cameras are installed. Conversely, cameras 43 and 44 may be positioned at an elevated height, situated on the sides of the road surface 20. The axle counter system requires the deployment of at least one camera per lane, one dedicated to capturing left-to-right traffic, and another focused on right-to-left traffic. This arrangement enables the cameras to capture footage of both lateral sides of the vehicle 24. Each camera defines a video stream, which is the continuous flow of video data captured by the camera's sensor and transmitted in real-time to a storage medium. It consists of juxtaposed frames, each representing a still image captured at a specific moment in time (t). The cameras of the camera assembly 40 can be embodied as fixed cameras, Pan-Tilt-Zoom (PTZ) cameras, Automatic Number Plate Recognition (ANPR) cameras, License Plate Recognition (LPR) cameras, or any other suitable cameras as known in the art. When affixed to the support structure 30, the cameras are strategically positioned to focus on a specific section of the road surface 20, delineating one or more dedicated zones 50, also referred to as regions of interest (ROIs). These dedicated zones 50 demarcate areas where vehicles entering the camera assembly's 40 field of view (FOV) trigger an event capture sequence. Specifically, when a vehicle crosses a dedicated zone 50, at least one of the cameras in the assembly 40 is automatically triggered to capture the vehicle's presence. The ROIs serve as virtual tripwires, enabling the system to proactively detect and respond to vehicles of interest within the monitored area, initiating data collection and tracking processes crucial for accurate vehicle identification and tolling. Upon a vehicle entering the dedicated zone 50, the detection assembly 40 is configured to gather various data points related to the vehicle 24, including but not limited to: lateral images 27 to record the number of axles 25 (captured by imaging devices 43 and 44), front and rear images of the vehicle (24a, 24b), photographs of the front and rear license plates (26), and details regarding the vehicle's model, make, color, speed, and classification. The assembly may also include LIDAR sensors that capture precise three-dimensional measurements of the vehicle, including height, length, width, and overall vehicle profile, enabling more accurate vehicle classification. The detection assembly 40 may be equipped with dual sensing devices per lane—one dedicated to capturing incoming traffic and another focused on outgoing traffic. These sensing devices may include various technologies such as high-resolution imaging systems with dual 5MP lenses 46, ultra-high-definition Doppler radar for vehicle monitoring, and LIDAR sensors for dimensional measurements. This multi-technology approach ensures comprehensive data capture that remains effective across diverse environmental conditions and traffic scenarios. In one embodiment, cameras may also include a processor 47, and a trigger device 48. The system recognizes when a vehicle's axle is raised, such as in the case of a tractor-trailer with a raised trailer axle. By analyzing the video streams from the axle cameras 43 and 44, the system detects raised axles and excludes them from the axle count used to determine the appropriate toll amount for the vehicle. This ensures accurate toll calculation by only factoring in the axles that are in contact with the road surface 20, preventing overcharging due to raised auxiliary axles. The axle detection and counting enhances the system's ability to classify vehicles and apply the correct toll rates based on their axle configurations while traversing the tolling network.

The cameras from the cameras assembly 40 may be affixed to the support structure in an initial position. However, cameras (41, 42, 43, 44) may incorporate an actuation mechanism 45 designed to adjust the positioning and orientation of the cameras autonomously. Wherein such actuation mechanism 45 may operate without human intervention and can be automated based on predetermined conditions. In one exemplary embodiment, the actuation mechanism 45 may be embodied as a motorized pan-tilt unit. A motorized pan-tilt unit allows the camera to pan (move horizontally) and tilt (move vertically) to change its field of view. This unit can be controlled remotely or programmed to respond automatically to specific triggers or conditions. For example, the system may detect a vehicle 24 approaching from a certain direction. Based on this detection, the motorized pan-tilt unit automatically adjusts the camera's position and angle to focus on the vehicle's license plate 26 as it enters the predetermined zone. In another example, the system may detect a sudden increase in traffic congestion or a specific event occurring in a particular area, the actuation mechanism 45 can reposition the cameras 40 to provide better coverage of the affected area, allowing for accurate monitoring and analysis. In another example, when adverse weather conditions are sensed, such as heavy rain or fog, the system can automatically adjust the camera's orientation to minimize interference and maintain optimal visibility, ensuring operation regardless of environmental factors. It is essential to mention that the motorized pan-tilt unit is described herein for explanatory purposes only, as it is recognized that mechanisms to control remotely and reposition cameras (defined herein as actuation mechanism 45) are widely known in the art.

The current invention involves a server assembly 60, which comprises a control hub 62. The control hub 62 which interfaces with the camera assembly 40 either wirelessly or through wired connections. In one exemplary embodiment, the control hub 62 may take the form of a compact module affixed to the support structure 30. The present invention relies on system-on-chip (SoC) devices that incorporate most or all of the components of a computer/electronic system onto a single chip. These components typically include a central processing unit (CPU), memory, input/output ports, and various peripherals such as analog-to-digital converters, digital signal processors, and communication interfaces. SoC devices are designed to be highly integrated, compact, and energy-efficient. By consolidating multiple functions onto a single chip, SoCs offer several advantages, including reduced power consumption, smaller form factors, simplified system design, and lower manufacturing costs. The SoCs approach enables the control hub 62 to be a compact module capable of governing the system's behavior, contrary to legacy systems that require a toll equipment building to house the electronics behind their tolling systems.

The server 60 may include a processor 63, a user interface 64, and a memory 65. The user interface 64 may take the form of a command line interface, a graphical user interface, a voice interface, or a web-based interface. It may be preferable for the memory 65 to be embodied as a hard drive, a network attached storage, or other types of machine-readable medium for the storage of electronic instructions. In one iteration of the present invention 10, vector databases 70 and machine learning (ML) modules 80 may be stored within the memory 65 of the server 60. ML modules 80 may include dynamic adjustment of cameras module 81 (DAC), plate recognition (PR) module 82, and Multi-Object Tracking (MOT) module 83. The multi-object tracking module 83 generates objects/vehicle trajectories from the video streams provided by the camera assembly 40. In one exemplary embodiment, module 83 may use deep learning object detectors to localize vehicles in each frame; in another embodiment, module 83 may use object re-identification models to associate detections of the same vehicle across frames; finally, module 83 may utilize algorithms such as SORT, Deep SORT, BoT-Sort, ByteTrack (state-of-the-art object tracking algorithms) to stitch detections into trajectories. The algorithms listed above are for explanatory purposes only and should not be interpreted in a limiting manner. An event correlation module 84 may also be utilized to address obstructed/incomplete vehicle information. Module 84 may use "nearest neighbor" methods to associate events belonging to the same trajectory and probabilistic data association models to fuse vehicle metadata across events. Module 81 may work in concert with sensors 90 to collect environmental data such as light levels, weather conditions, time of day, etc. This data may then be stored along with labeled image quality scores to serve as a ground of truth. Using the collected data, module 81 may use an ML model trained to predict the optimal camera setting given various environmental conditions, the model may learn the mapping between environmental factors and ideal configuration parameters such as exposure, gain, shutter speed, white balance, etc. for achieving high image quality.

The camera assembly 40 provides one or more video streams to the server assembly 60. A video stream comprises a continuous sequence of video frames captured by a camera over time. The multi-object tracking module 83 processes these video streams to detect and track multiple vehicles simultaneously. Specifically, module 83 applies deep-learning object detectors to localize vehicles in each video frame. It then associates detections of the same vehicle across subsequent frames using re-identification models. Finally, it stitches these associated detections into coherent trajectories using state-of-the-art multi-object tracking algorithms like SORT or Deep SORT. A vehicle's trajectory represents the path taken by that vehicle, comprising a sequence of spatial coordinates and their corresponding timestamps derived from the video streams.

Figure 7:
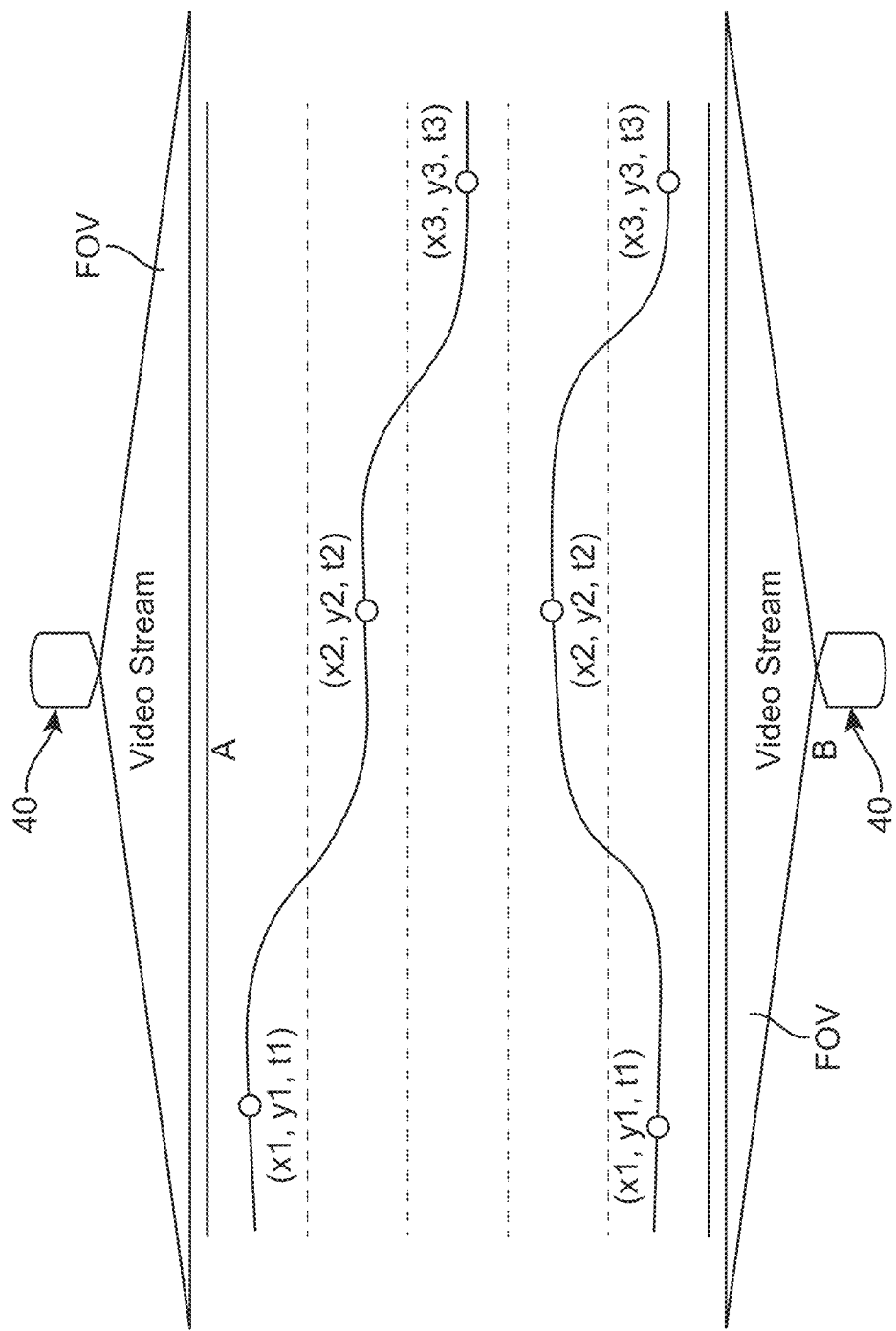
FIG. 7 is an illustrative schematic representation of the present invention according to an exemplary embodiment thereof, wherein maps from multiple vehicle trajectories are derived from one or more video streams. The system uses the derived map of trajectories to correlate events emitted from a plurality of roadside devices.

As illustrated in FIG. 7, in one exemplary embodiment of the present invention, the camera assembly 40, in conjunction with the server 60 operates autonomously. For a given camera, such as an Automatic Number Plate Recognition (ANPR) camera, the decision to trigger an event is completely handled by the device itself. This can be achieved through integration with a radar to detect when a vehicle has entered or left the region covered by the field of view (FOV) of the camera. The parameters controlling the process (e.g., threshold, confidence level to determine if it makes sense to trigger or not) are established and controlled per device.

As a consequence, the system ends up with a set of disconnected events from each device with different levels of confidence. The system then uses Multi-Object Tracking (MOT) to group those events by vehicle. Specific zones or areas within the field of view of each camera are defined as triggering zones. Every time a vehicle enters the FOV of one camera and passes through the triggering zone, the event is captured and processed.

Traditional systems have the disadvantage that they may receive duplicates or miss some events (e.g., radar failed to trigger). The system may use deduplication techniques (e.g., preferring the highest confidence ANPR event when a camera emitted multiple reads for the same car) and identification of incomplete transactions (e.g., the ANPR didn't capture the vehicle).

Figure 8:
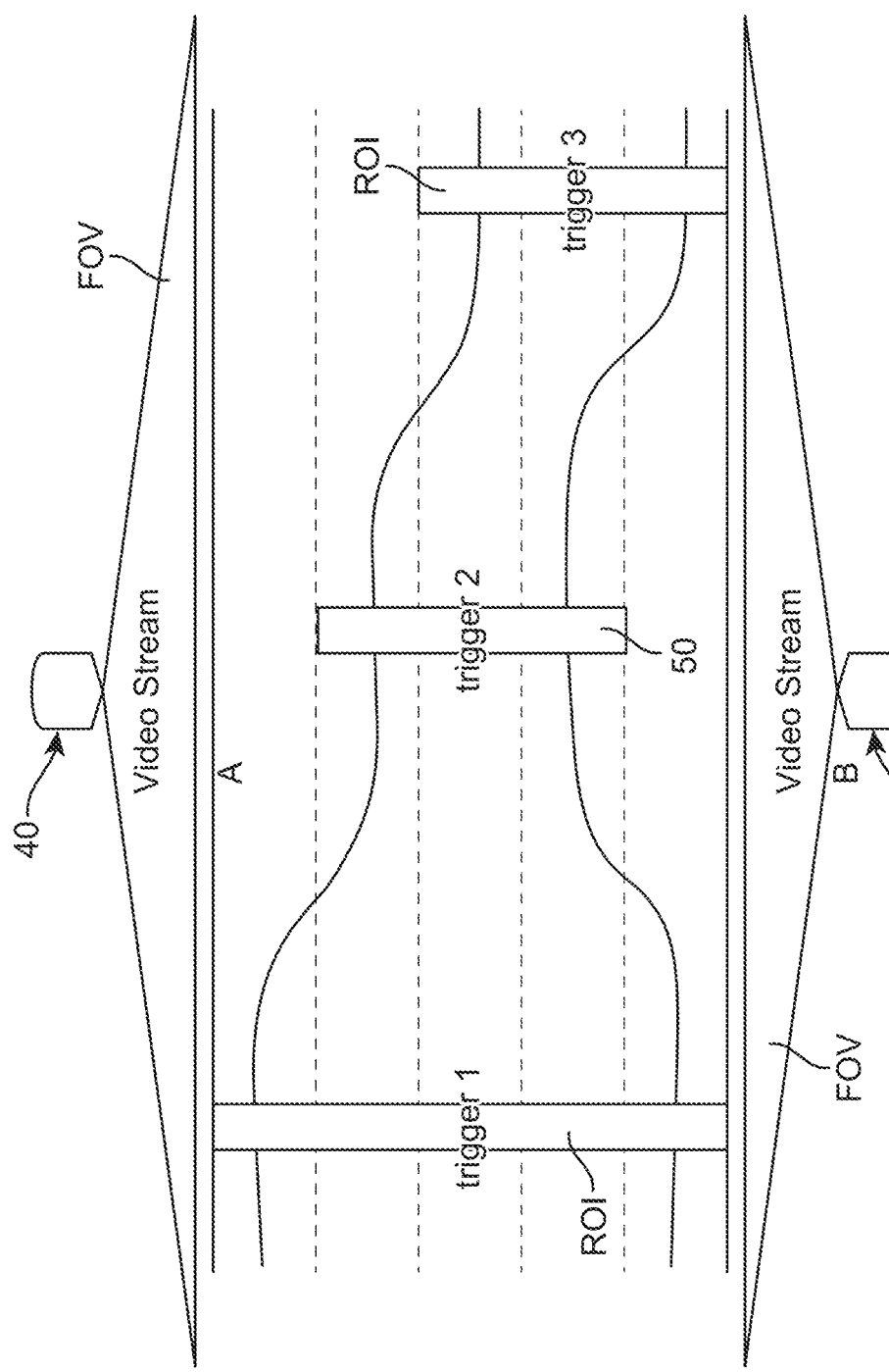
FIG. 8 is a schematic representation of the present invention according to an exemplary embodiment thereof, wherein the system has predefined regions of interest mapping the field of view of the cameras. When a vehicle is detected entering a given region of interest, a relevant camera is instructed to make a read. The system behaves as a digital trigger for roadside devices, cameras tracking when vehicles enter/leave the triggering zone specified by each individual device.
Figure 9:
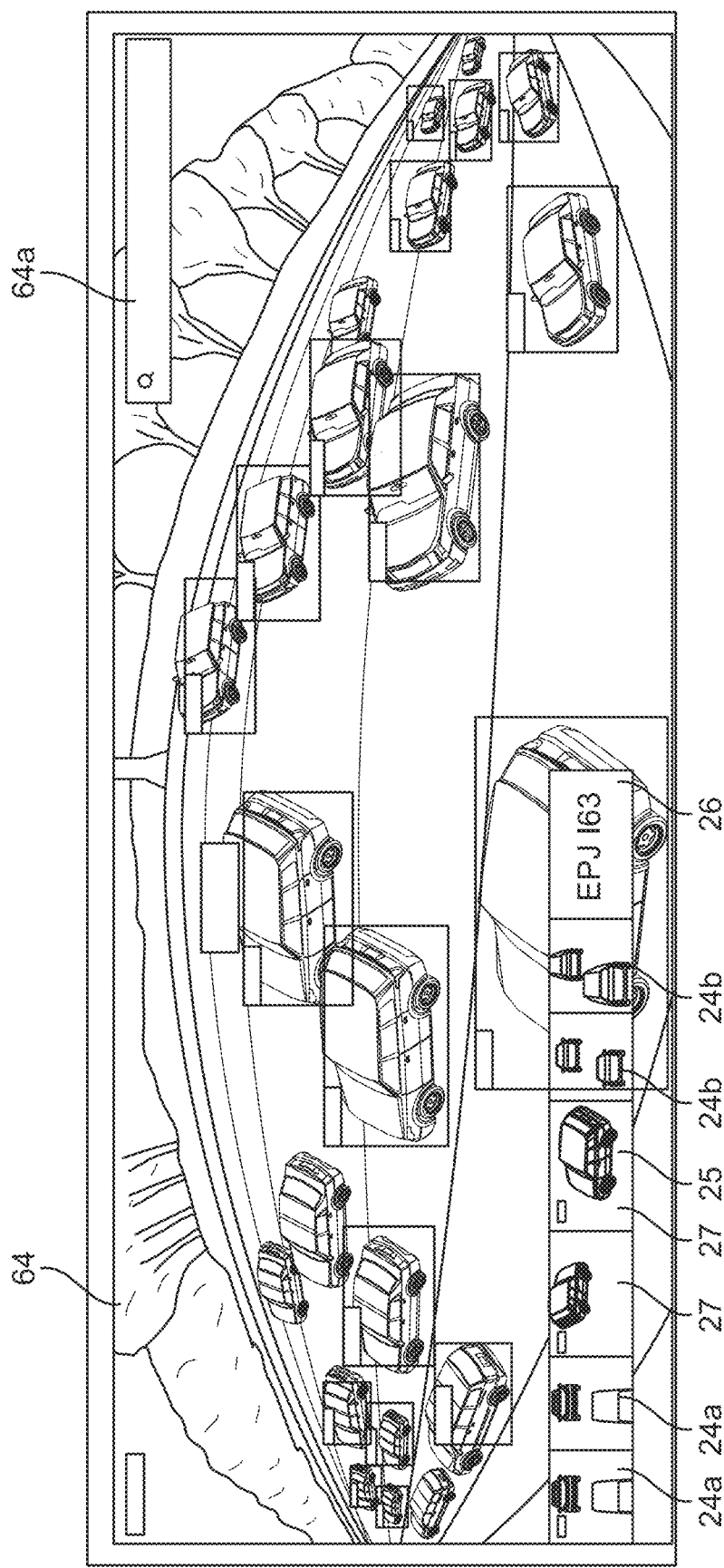
FIG. 9-11 represent exemplary embodiments of the DVAS user interface, showing the synchronized video feeds, metadata display, and filtering capabilities.

As illustrated in FIG. 8, in another exemplary embodiment of the present invention, multi-object tracking and trajectory generation run in real-time. The system has predefined regions of interest (ROIs) that map the field of view of the cameras. When the system detects a vehicle entering a given ROI, it instructs the relevant camera to capture an image or perform a read (this may be done multiple times for the same vehicle and FOV to obtain various samples and improve overall accuracy).

In this operating mode, the system acts as a software-based trigger for the cameras, and the events are naturally correlated. APIs of the cameras allow the trigger to pass some custom data, which is replicated in the event emitted by the device. The custom data is encoded in an identifier of the trajectory that triggered the event. Therefore, when the system processes a set of events emitted by roadside devices, it can identify the trajectory or vehicle with which they are associated.

Wherein in the present embodiment of the present invention, the calibration is centralized (the software is the trigger, and it has a single source to control and adjust the threshold or confidence level to use when deciding whether a read should trigger an event).

The cameras are lighter (no built-in trigger is required, and no radar or computer vision-based processing for object or movement detection is necessary). However, the multi-object tracking must happen in real-time (to determine the location of a vehicle within the FOV of a camera and trigger if appropriate), hence the computing power required roadside is more expensive.

The resulting trajectories enable correlating events captured by the various cameras in the assembly 40 as well as other roadside devices like radars. The event correlation module 84 maps these trajectories in a multi-dimensional space, with two spatial dimensions and one temporal dimension. Roadside events like camera triggers or radar detections can then be associated with specific vehicle trajectories based on their spatial and temporal proximity, using techniques like nearest neighbor methods and probabilistic data association models. This trajectory-based event correlation allows the system to stitch together a comprehensive vehicle profile even when certain events may have captured incomplete information due to obstructions or other factors.

The multi-object tracking (MOT) system integrates multiple synchronized video sources to provide a unified and comprehensive visual representation of the site. This multi-camera setup enhances the accuracy and reliability of the MOT machine learning model by addressing common deployment challenges such as: road alignment, in which the system leverages different camera perspectives to align the MOT model with the road layout, accounting for curved roads, intersections, and other complex geometries; vehicle obstructions, wherein by combining views from multiple cameras, the system overcomes occlusions caused by large vehicles, buildings, or other obstructions that may block the line of sight of a single camera; irregular maneuvers, with a comprehensive view of the site, the MOT model can better track vehicles that exhibit irregular maneuvers, such as sudden lane changes, U-turns, or unexpected stopping/starting; dense traffic, for in high-density traffic scenarios, where vehicles may overlap or occlude each other from a single camera's perspective, the multi-camera setup provides additional viewpoints to maintain accurate tracking; or stop-and-go conditions, wherein the integrated video sources enable the MOT model to reliably track vehicles in stop-and-go traffic conditions, where vehicles frequently change speed or come to a complete stop.

The multi-camera setup is designed to operate in a synchronized manner, ensuring that the video streams from different sources are temporally aligned. This synchronization allows the MOT model to fuse the visual information from various angles and perspectives into a cohesive representation of the site.

By considering multiple viewpoints, the MOT model can achieve higher recall (correctly identifying and tracking more vehicles) and higher precision (reducing false positives or incorrect associations). The integration of multiple video sources effectively reduces blind spots and improves vehicle tracking under diverse traffic scenarios, leading to more accurate multi-object tracking results.

Digital Video Audit System (DVAS) Components

Figure 6:
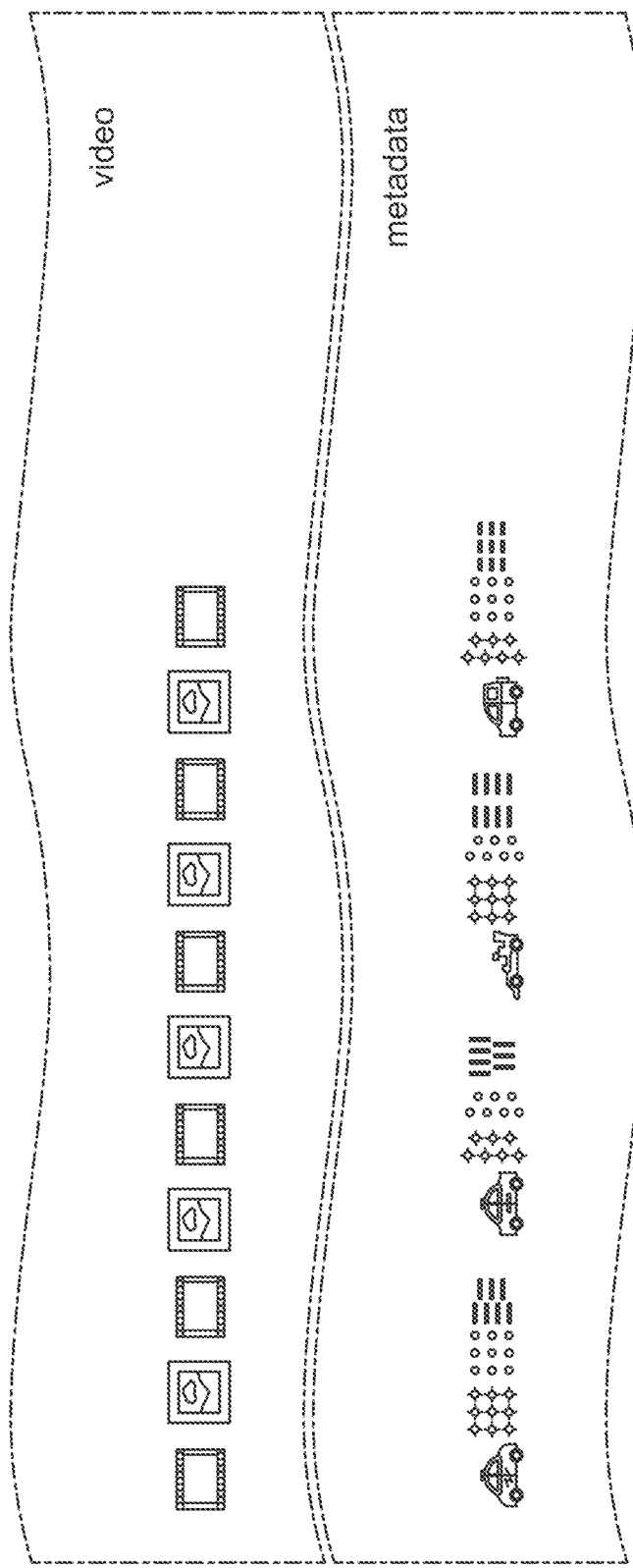
FIG. 6 illustrates a schematic representation of the present invention used for concurrent transmission of video content and associated metadata. Wherein the system combines structured metadata with video data properly synchronized.

The Digital Video Audit System (DVAS) may comprise a solution for toll transaction verification, auditing, and reporting. The DVAS may include a smart transportation video streaming method for concurrent transmission of video content and associated metadata, as illustrated in FIG. 6. An encoder, or the like, may combine structured metadata with the video data in a synchronized manner. This structured metadata may include, but not be limited to, a sequence of bounding boxes identifying vehicles, vehicle make/model information, license plate data, axle count, vehicle classification, and toll transaction details.

The DVAS may include a video player component capable of rendering the enriched video stream along with relevant overlays and visual information derived from the associated metadata. A key technical feature of the DVAS may be its ability to display zone controller transactional data inputs either laid directly onto or inserted adjacent to the video data, providing immediate visual correlation between vehicle presence and the corresponding toll transaction. The system may ensure that the video and metadata are not just intertwined but are also transmitted with utmost integrity, maintaining perfect synchronization between the visual data and the corresponding vehicle information.

The DVAS integrates multiple video feeds from the camera assembly 40 and synchronizes them temporally to provide visual coverage of each toll transaction. Users can seamlessly switch between different camera angles (front, rear, axle) with a single click while maintaining the same timestamp across all views. This synchronization enables operators to observe a vehicle from multiple perspectives simultaneously or sequentially without losing temporal context.

The DVAS may integrate not only synchronized video feeds but also the transactional data and metadata associated with each vehicle, providing a view in one unified interface. This integration may eliminate the need for operators to navigate between separate systems to correlate video evidence with transaction records, significantly enhancing operational efficiency. This metadata includes, but is not limited to: license plate information; vehicle characteristics; transaction details (timestamp, toll amount, payment method); vehicle measurements. Wherein all data is displayed in an interface that allows operators to assess transaction accuracy and identify potential discrepancies. The underlying trajectory mapping technology ensures that even when certain data points are obstructed or missing from a single camera view, the system can still present a complete vehicle profile by referencing data captured from other cameras along the vehicle's trajectory.

Figure 10:
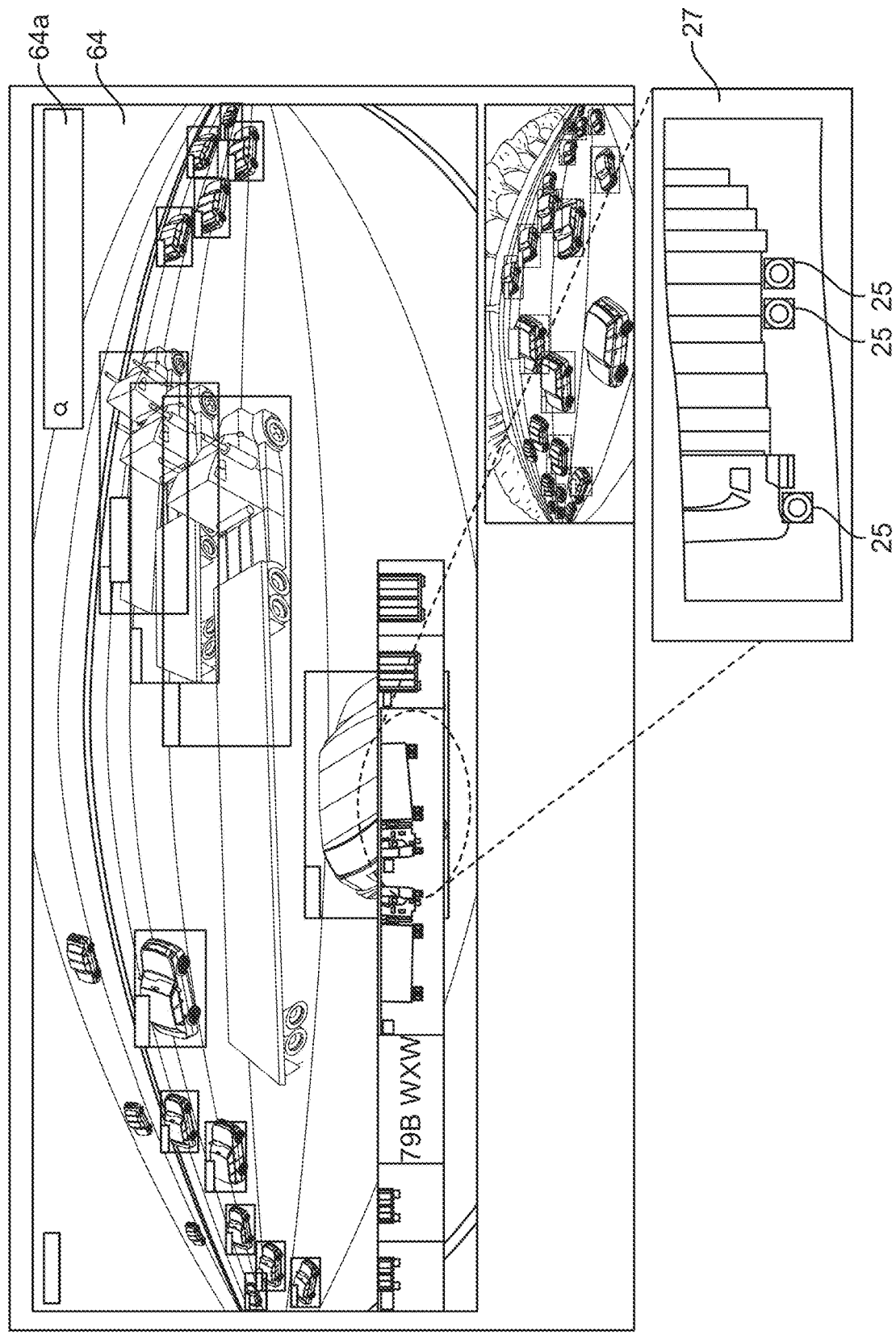

A distinguishing feature of the DVAS may be its dynamic filtering capabilities, as shown in FIG. 10. The system may include a filtering panel 64b that allows users to filter toll transaction data across multiple dimensions, including time, lane, license plate, axle count, vehicle dimensions (height, length, width), vehicle profile classification, state, country, vehicle make, model, color, and speed. The filtering panel 64b enables operators to input specific filter criteria and immediately see the filtered results displayed in a results table 64c. These filters may be activated or deactivated on demand, with the system adjusting in real-time to provide a fully customizable audit experience. This advanced filtering functionality may enable operators to quickly isolate transactions of interest, facilitating efficient verification and auditing processes.

The vehicle profile classification is particularly valuable as it aligns with Department of Transportation (DOT) standards used by many toll authorities to determine appropriate toll rates based on standardized vehicle categories. These filters may be activated or deactivated on demand, with the system adjusting in real-time to provide a fully customizable audit experience. This advanced filtering functionality may enable operators to quickly isolate transactions of interest, facilitating efficient verification and auditing processes. The comprehensive nature of these filtering options ensures that the DVAS can adapt to various tolling regimes and regulatory frameworks across different jurisdictions, each of which may employ distinct vehicle classification systems for toll calculation.

The DVAS may incorporate full-text search capabilities engineered to navigate through the rich metadata embedded within the video streams. Users may be able to perform detailed searches using license plate numbers, time ranges, vehicle make, and model information. The search interface may leverage the vector embeddings stored in the vector database 70, enabling similarity-based queries that can retrieve relevant vehicle profiles even when search criteria are partial or imprecise.

Figure 11:
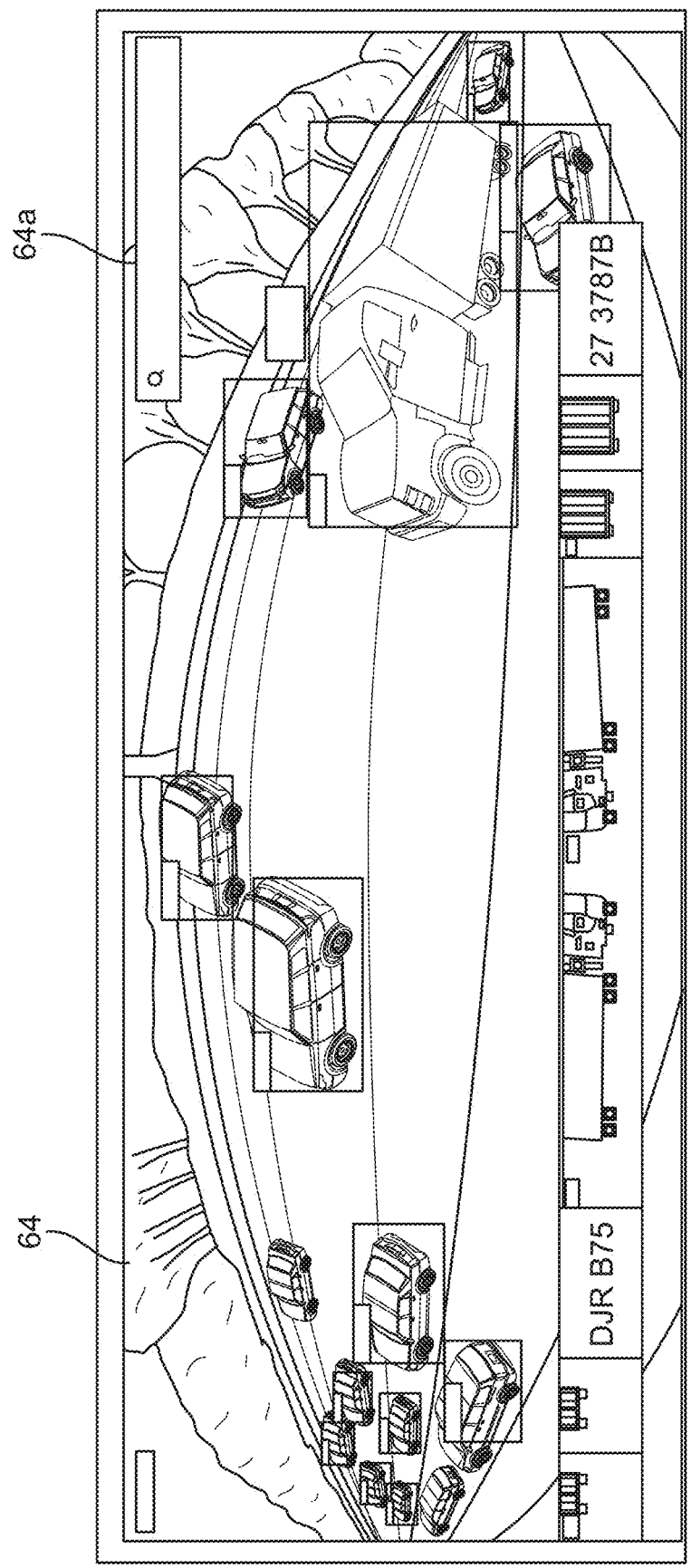

The user interface 64 of the DVAS, as illustrated in FIG. 11, may provide auditing and reporting tools/capabilities. The system may support transactional data corrections and editing, allowing operators to rectify discrepancies identified during the audit process. Additionally, the DVAS may enable users to generate and print audit reports directly from the system, facilitating documentation and compliance requirements.

Figure 12:
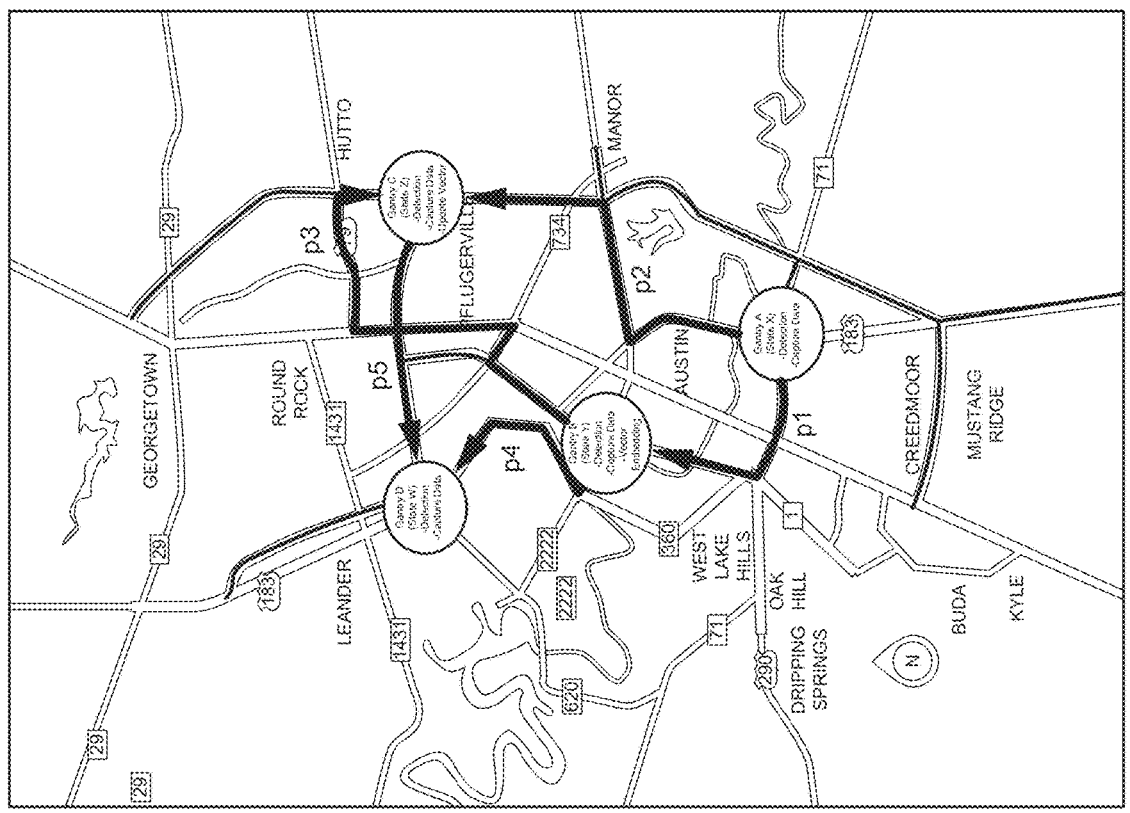
FIG. 12 illustrates an exemplary Markov chain representation embodied in an exemplary road map. The map shows gantries distributed along the roadways at various intersections. Each gantry is labeled with a letter (A-D) and is connected to other gantries, defining a network.
Figure 13:
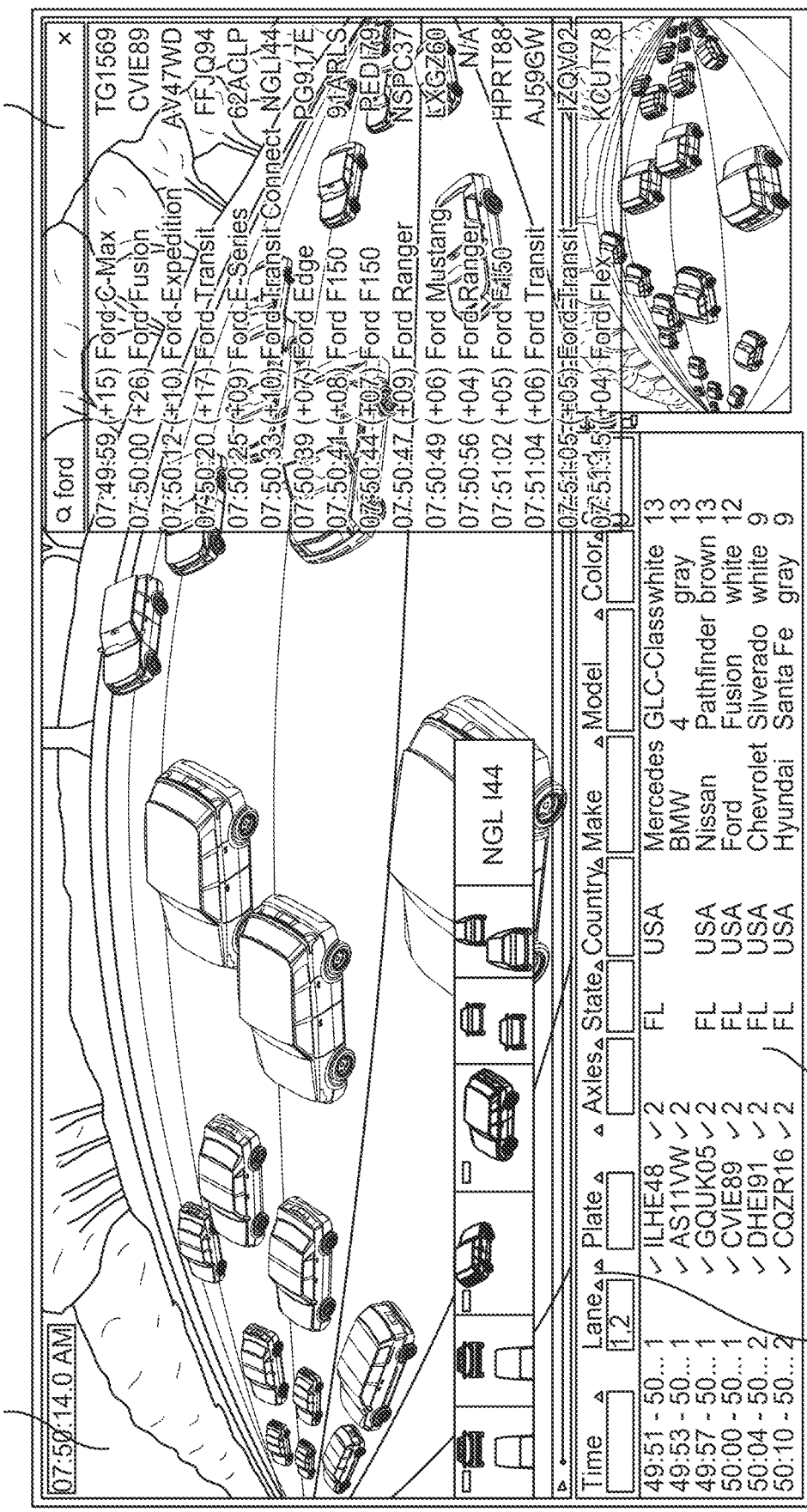
FIG. 13 illustrates the DVAS interface with dynamic filtering controls for various vehicle parameters, including, but not limited to, time, lane, license plate, vehicle characteristics.
Figure 14:
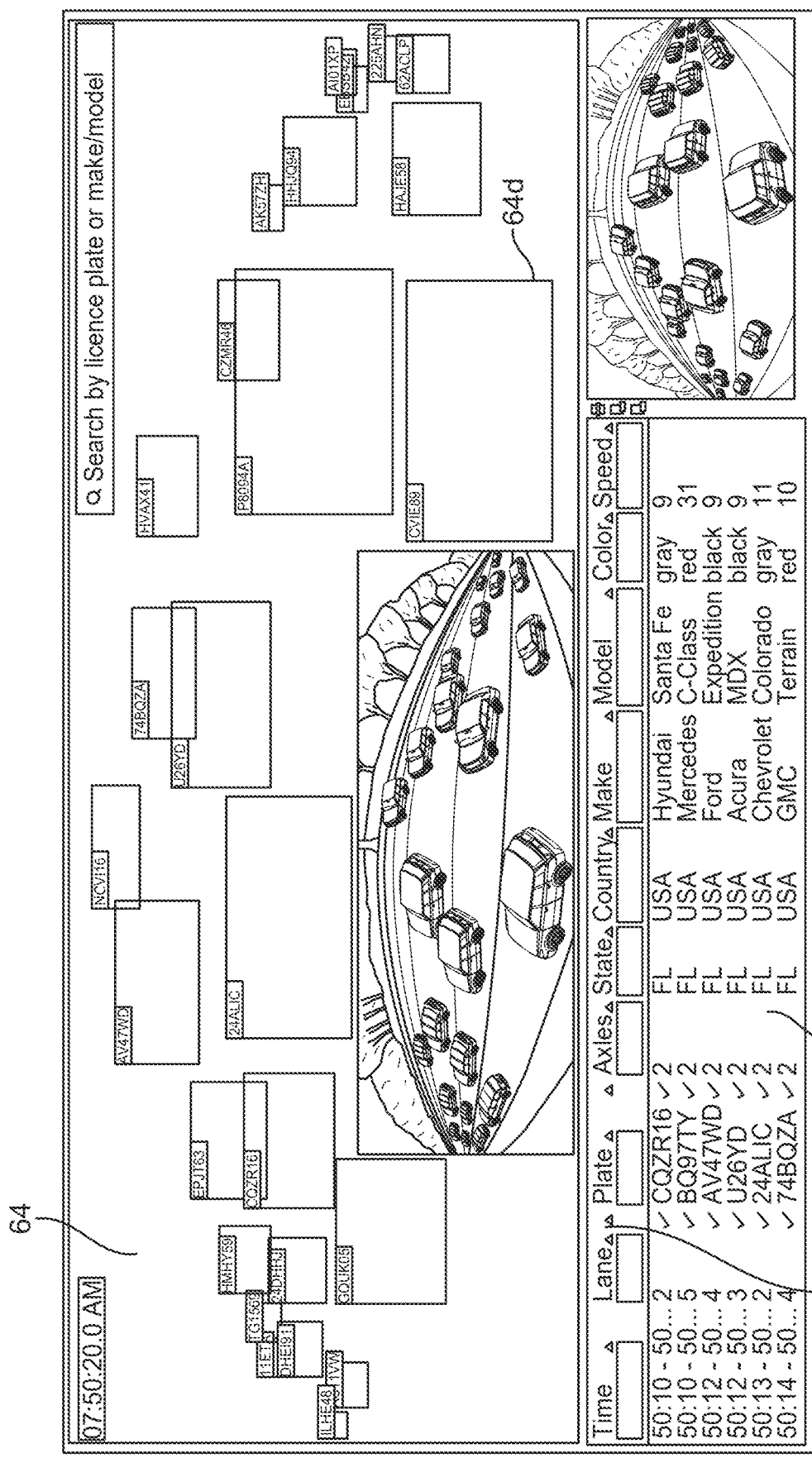
FIG. 14 illustrates the DVAS user interface with separate visual components. The upper portion displays independent bounding boxes with license plate identifiers against a background, deliberately unstitched from the actual video footage shown in the central picture-in-picture view. This separation demonstrates how the system tracks vehicles independently from the raw camera feed. The lower section features a comprehensive filtering panel allowing operators to sort transactions by multiple parameters, including time, license plate, and vehicle characteristics, showcasing the system's dynamic filtering capabilities for transaction verification.
Figure 15:
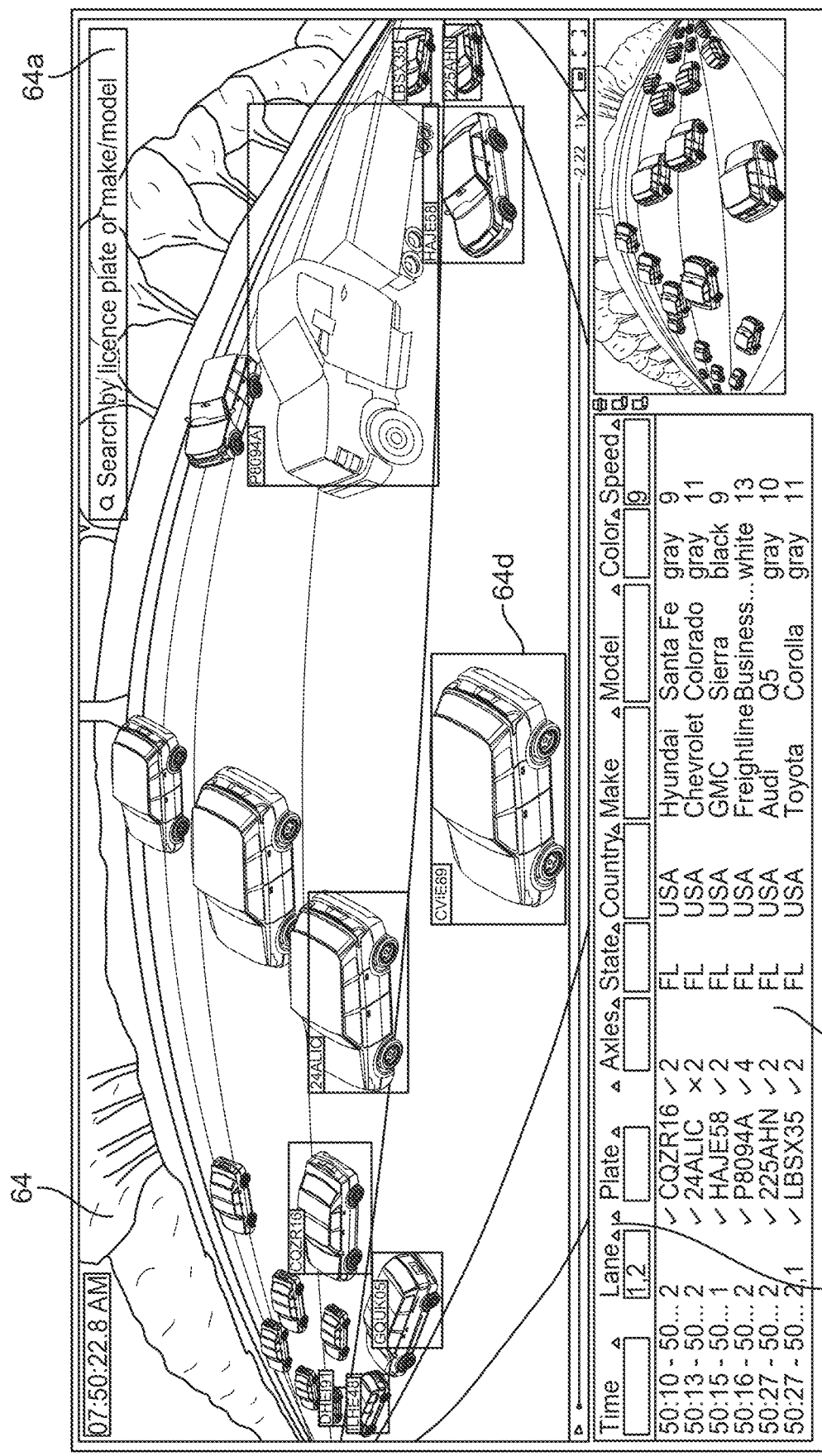
FIG. 15 illustrates the advanced visualization capabilities of the DVAS user interface with fully integrated vehicle detection. This display shows bounding boxes directly overlaid on the video footage, with each box precisely enclosing its corresponding vehicle and displaying the associated license plate number. The integration creates immediate visual correlation between vehicles and their identifying information. The lower portion displays the filtering panel in one exemplary embodiment, where lane filters have been applied (values "1,2" visible in the Lane filter field), demonstrating how operators can selectively display only vehicles in specified lanes. The filtered results table shows transaction data matching these criteria, enabling rapid verification and auditing of selected transactions through the direct visual association between detected vehicles and their corresponding transaction records.

A key aspect of the event correlation process may be the generation of robust vector representations or embeddings for each vehicle. While embeddings are commonly associated with natural language processing, the underlying principles may apply equally to computer vision and other ML domains. Through a feature extraction process and additional ML inference, the system may derive an informative vector embedding that may encapsulate the salient attributes of each vehicle, positioning it as a point in a high-dimensional space. With these embeddings computed, determining whether a vehicle A detected at gantry X is the same vehicle A observed at a different gantry Y may become a straightforward task. By calculating the cosine similarity or employing analogous vector similarity techniques between the embeddings of A at X and A at Y, and applying a sensible threshold, the system may establish whether the two observations correspond to the same vehicle traversing across the different gantry locations as depicted in FIG. 12, wherein $p_n$ may indicate the probability of a vehicle moving from one gantry to another.

The user interface 64 may be embodied as a graphical user interface (GUI) accessible through a web browser or a dedicated application. The GUI in communication with assembly 40, may provide a live view of the section of the road being monitored. Additionally, the GUI may overlay relevant information onto the video feed, such as vehicle trajectories, license plate numbers, and other vehicle metadata extracted by the system. The GUI may isolate and enclose individual vehicles and lanes within bounding boxes 64d, with tags displaying the license plate number for identified vehicles. In one embodiment, vehicles within the camera's field of view but outside the dedicated zones 50 where the system actively operates may be enclosed in bounding boxes 64d with broken lines to distinguish them from vehicles being actively tracked and tolled within the dedicated zones.

The GUI may include a search interface that may allow the user to query using a search bar 64a the vector database 70 for recorded vehicle profiles. The search interface may enable quick and efficient similarity-based searches by leveraging the vector embeddings generated for each vehicle. Wherein the user may input various criteria, such as license plate numbers, vehicle make and model, or the like, and the system may retrieve the most similar vehicle profiles from the database by comparing the query against the stored vector embeddings. The vector embeddings, stored in the vector database 70, may enable similarity searches by representing each vehicle profile as a high-dimensional vector in a shared embedding space. The system may calculate the cosine similarity or other distance metrics between the user's query and the stored embeddings and may return the vehicle profiles with the highest similarity scores. This approach may allow for fast and accurate retrieval of relevant vehicle information, even when the query criteria are partial or imprecise. The GUI may further provide tools for analyzing and visualizing the retrieved vehicle profiles, such as displaying the associated trajectories, events triggered at different gantries or cameras, and any other relevant metadata captured by the system. Wherein having this view may aid in monitoring and investigating specific vehicles of interest, as well as auditing the system's performance and accuracy.

The DVAS may enable toll operators to generate customizable reports based on the audit findings. These reports may include statistical summaries of toll transactions, exception reports highlighting discrepancies, and detailed logs of audit activities. The reporting functionality may support various export formats, facilitating integration with external financial and operations management systems.

The comprehensive vehicle trajectories and associated vehicle profiles generated by the system may enable automated tolling. As a vehicle traverses the tolling network covered by the camera assembly 40 and other roadside devices, its trajectory may be mapped in space and time based on the correlated events triggered at different locations. Each event may capture detailed vehicle information like license plate number, make, model, and axle count. By stitching together this data from multiple events along the vehicle's trajectory, the system may build a robust vehicle profile even if certain details were obstructed or missed at individual event locations. The vehicle's complete trajectory through the tolling network, coupled with its associated metadata like vehicle class and axle configuration, may allow the system to automatically calculate the appropriate toll charges based on the applicable pricing policies and roads utilized. This automated, data-driven approach may minimize revenue leakage for toll agencies by ensuring that accurate tolls are charged for every vehicle passing through the network, even in challenging conditions like heavy traffic where conventional single-point tolling systems may miss or incorrectly identify vehicles. The DVAS may serve as a critical auditing component that provides visual verification and monitoring of toll transactions, helping ensure system accountability and verifying the proper operation of the toll collection system.

The DVAS may employ advanced data storage and retrieval mechanisms to manage the large volumes of video and metadata generated by the tolling operations. The system may implement intelligent data retention policies, allowing agencies to define how long different types of data should be preserved based on operational, legal, and compliance requirements. The storage architecture may support tiered storage solutions, automatically migrating older data to more cost-effective storage mediums while maintaining rapid access to recent and frequently accessed information.

The security of toll transaction data may be a paramount concern addressed by the DVAS. The system may implement access controls, user authentication mechanisms, and audit logging to ensure that sensitive vehicle and transaction information is protected against unauthorized access or modification. All data transmissions between system components may be encrypted, and the storage repositories may implement appropriate encryption-at-rest measures to safeguard the integrity and confidentiality of the information. The DVAS may be designed to operate on established network infrastructures that provide Layer 3 (Network Layer) data transport and key network services, ensuring secure and reliable communication between all components of the toll collection system.

The DVAS may be designed with scalability and redundancy, capable of handling varying traffic volumes and expanding to accommodate growth in the tolling infrastructure. The system architecture may support horizontal scaling, allowing agencies to add additional computing resources as needed to process increased data loads. Moreover, the DVAS may be configured to operate across multiple tolling facilities, providing a centralized audit and verification capability for regional or statewide tolling authorities. A critical aspect of the DVAS design may be the implementation of appropriate redundancy and mitigation strategies for single points of failure. The system may incorporate redundant components, failover mechanisms, and disaster recovery capabilities to ensure continuous operation and prevent revenue loss due to system failures. In different embodiments, this robust architecture may be essential for meeting the high availability and accuracy key performance indicators (KPIs) required by toll collection systems.

In multiple exemplary embodiments, The DVAS may interface with the other subsystems of the toll collection infrastructure in accordance with standard system interface diagrams. The integration with the Roadside Subsystem (RS) may allow the DVAS to receive real-time video feeds and transaction data from the roadside equipment. The interface with the Central Host Subsystem (CHS) may enable the DVAS to access centralized transaction records, user accounts, and system configuration parameters. Integration with the Maintenance Management System (MMS) may facilitate monitoring of the DVAS components' health and performance, ensuring timely maintenance and minimizing system downtime. Wherein this integration approach may ensure that the DVAS functions as a cohesive part of the overall toll collection ecosystem rather than an isolated audit tool.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A Digital Video Audit System (DVAS) for transportation infrastructure monitoring and transaction verification, comprising:
at least one camera configured to capture video streams of vehicles traversing an infrastructure; a server having a processor and a memory storing instructions that, when executed by the cause the processor, system to:
synchronize multiple video feeds from said at least one camera;
process vehicle metadata;
generate vehicle trajectories from said synchronized video feeds by applying deep learning object detectors to localize vehicles in video frames and stitch associated detections into coherent paths;
correlate events associated with vehicles captured in said video feeds and associate said events with said vehicle trajectories;
display zone controller transaction data integrated with corresponding multiple video feeds through a user interface; and
enable dynamic filtering of transaction data across multiple dimensions including time, lane, license plate, vehicle characteristics, speed, velocity, and transaction parameters, facilitating audit and verification of transactions.

2. The Digital Video Audit System of claim 1, wherein the instructions further cause the system to:
- generate vector embeddings representing vehicle profiles through feature extraction and machine learning inference;
- store said vector embeddings in a vector database; and
- enable similarity-based searches by comparing query criteria against stored vector embeddings, retrieving relevant vehicle profiles even when search criteria are partial or imprecise.

3. The Digital Video Audit System of claim 1, wherein the instructions further cause the system to:
- implement a video streaming method that concurrently transmits video content and associated metadata;
- combine structured metadata including bounding boxes, vehicle make/model information, license plate data, and transaction details with video data in a synchronized manner; and
- render the enriched video stream with relevant overlays and visual information derived from the associated metadata.

4. The Digital Video Audit System of claim 1, wherein the system:
- maps vehicle trajectories in a multi-dimensional space comprising spatial and temporal dimensions;
- associates events with said trajectories based on spatial and temporal proximity;
- maintains trajectory continuity even when vehicle identifiers are temporarily obstructed at individual detection points; and
- reconstructs complete vehicle profiles by correlating data from multiple detection points along each vehicle's journey through the monitored infrastructure.

5. The Digital Video Audit System of claim 1, wherein the instructions further cause the system to generate customizable reports based on audit findings, including statistical summaries of toll transactions, exception reports highlighting discrepancies, and detailed logs of audit activities; support transaction data corrections and editing through the user interface; implement intelligent data retention policies for managing video and metadata storage; maintain secure access controls and data encryption for protecting sensitive vehicle and transaction information.

6. The Digital Video Audit System of claim 1, wherein displaying zone controller transaction data integrated with corresponding multiple video feeds data comprises:
- overlaying transaction data directly onto the video frames containing the corresponding vehicles;
- dynamically positioning the overlaid data to maintain visual association with the vehicles as they move through the field of view; and
- visually differentiating the overlaid data from the background video content to ensure readability while maintaining contextual association.

7. The Digital Video Audit System of claim 1, wherein the user interface further comprises:
- a filtering panel configured to accept user input for filtering transaction data by multiple selectable parameters simultaneously, said parameters including at least time, lane, license plate, vehicle dimensions, and vehicle characteristics; and
- a results table configured to display filtered transaction data in real-time as filtering parameters are applied or modified, wherein the results table maintains visual correspondence with vehicles shown in said multiple video feeds.

* * * * *